United States Patent
Voudouris

(10) Patent No.: US 11,413,118 B2
(45) Date of Patent: Aug. 16, 2022

(54) ORTHODONTIC MOLAR DISTALIZER

(71) Applicant: Spartan Orthodontics Inc., Toronto (CA)

(72) Inventor: John C Voudouris, Toronto (CA)

(73) Assignee: Spartan Orthodontics, Inc., Toronto (CA)

( * ) Notice: Subject to any disclaimer, the term of this patent is extended or adjusted under 35 U.S.C. 154(b) by 283 days.

(21) Appl. No.: 16/625,510

(22) PCT Filed: Jun. 28, 2018

(86) PCT No.: PCT/CA2018/000134
§ 371 (c)(1),
(2) Date: Dec. 20, 2019

(87) PCT Pub. No.: WO2019/000074
PCT Pub. Date: Jan. 3, 2019

(65) Prior Publication Data
US 2021/0401547 A1   Dec. 30, 2021

Related U.S. Application Data

(60) Provisional application No. 62/575,111, filed on Oct. 20, 2017, provisional application No. 62/526,058, filed on Jun. 28, 2017.

(51) Int. Cl.
*A61C 7/22* (2006.01)
*A61C 7/14* (2006.01)

(52) U.S. Cl.
CPC . *A61C 7/22* (2013.01); *A61C 7/14* (2013.01)

(58) Field of Classification Search
CPC .................................. A61C 7/22; A61C 7/14
USPC ............................................................ 433/21
See application file for complete search history.

(56) References Cited

U.S. PATENT DOCUMENTS

| | | | | |
|---|---|---|---|---|
| 3,690,003 A | * | 9/1972 | Gerber | A61C 7/12 433/18 |
| 5,064,370 A | * | 11/1991 | Jones | A61C 7/00 433/21 |
| 5,299,935 A | * | 4/1994 | Lokar | A61C 7/00 433/18 |
| 5,401,168 A | * | 3/1995 | Magill | A61C 7/22 433/18 |

(Continued)

FOREIGN PATENT DOCUMENTS

| CN | 205031374 U | * | 2/2016 |
|---|---|---|---|
| CN | 205031374 U | | 2/2016 |

(Continued)

*Primary Examiner* — Jacqueline T Johanas
*Assistant Examiner* — Holly T. To
(74) *Attorney, Agent, or Firm* — McMillan LLP

(57) ABSTRACT

An orthodontic molar distalizer having a molar component, a mesial anchor tooth attachment, and an elongate member therebetween. The elongate member features a hook for receiving a traction member for imparting distalizing force. A spring biasing means is positioned between the hook and the molar tube for applying distalizing force on the molar component and reducing canine over eruption. A telescopic distalizer comprised of an inner tube, an outer tube, and a plunger can be adjusted to a patient's anatomy. An arched distalizer having a threaded bolt connection between the elongate member and the molar component is also provided.

18 Claims, 20 Drawing Sheets

(56) References Cited

U.S. PATENT DOCUMENTS

| | | | | | |
|---|---|---|---|---|---|
| 5,545,037 | A * | 8/1996 | Takeshi | A61C 7/22 | 433/19 |
| 5,620,320 | A * | 4/1997 | Luse | A61C 7/06 | 433/21 |
| 5,645,422 | A * | 7/1997 | Williams | A61C 7/10 | 433/7 |
| 5,967,774 | A * | 10/1999 | Teramoto | A61C 7/282 | 433/18 |
| 6,053,730 | A * | 4/2000 | Cleary | A61C 7/36 | 433/18 |
| 6,976,839 | B2 * | 12/2005 | Lluch | A61C 7/00 | 433/18 |
| 7,578,672 | B2 * | 8/2009 | Sheikh | A61C 7/36 | 433/19 |
| 8,905,754 | B1 * | 12/2014 | Ernstberger | A61C 7/00 | 433/18 |
| 9,993,317 | B2 * | 6/2018 | Kottemann | A61C 7/36 | |
| 2002/0172909 | A1 * | 11/2002 | Williams | A61C 7/10 | 433/19 |
| 2003/0039939 | A1 * | 2/2003 | Farzin-Nia | A61C 7/20 | 433/18 |
| 2007/0218415 | A1 * | 9/2007 | Lluch | A61C 7/00 | 433/7 |
| 2009/0061377 | A1 * | 3/2009 | Cope | A61C 7/00 | 433/18 |
| 2012/0070797 | A1 * | 3/2012 | Edgren | A61C 7/36 | 433/19 |
| 2015/0327957 | A1 * | 11/2015 | Faust | A61C 7/12 | 433/19 |
| 2016/0000531 | A1 * | 1/2016 | Radmall | A61C 7/36 | 433/17 |
| 2016/0120624 | A1 * | 5/2016 | Yousefian | A61C 7/282 | 433/17 |
| 2018/0214249 | A1 * | 8/2018 | Ward | A61C 7/10 | |
| 2019/0262102 | A1 * | 8/2019 | Haralambidis | A61C 7/28 | |
| 2020/0060789 | A1 * | 2/2020 | Sachdeva | A61C 5/30 | |
| 2020/0146782 | A1 * | 5/2020 | Cope | A61C 7/141 | |
| 2020/0163742 | A1 * | 5/2020 | Suriano | A61C 7/14 | |
| 2020/0345463 | A1 * | 11/2020 | Dischinger | A61C 7/36 | |

FOREIGN PATENT DOCUMENTS

| | | | | |
|---|---|---|---|---|
| EP | 2957253 A1 * | 12/2015 | | A61C 7/22 |
| WO | WO-2010120714 A1 * | 10/2010 | | A61C 7/36 |
| WO | WO-2013128400 A2 * | 9/2013 | | A61C 7/22 |
| WO | 2017070799 A1 | 5/2017 | | |
| WO | WO-2017070799 A1 * | 5/2017 | | A61C 7/12 |
| WO | WO-2017090062 A1 * | 6/2017 | | A61C 7/22 |
| WO | 2017152267 A1 | 9/2017 | | |
| WO | WO-2017152267 A1 * | 9/2017 | | A61C 7/28 |

* cited by examiner

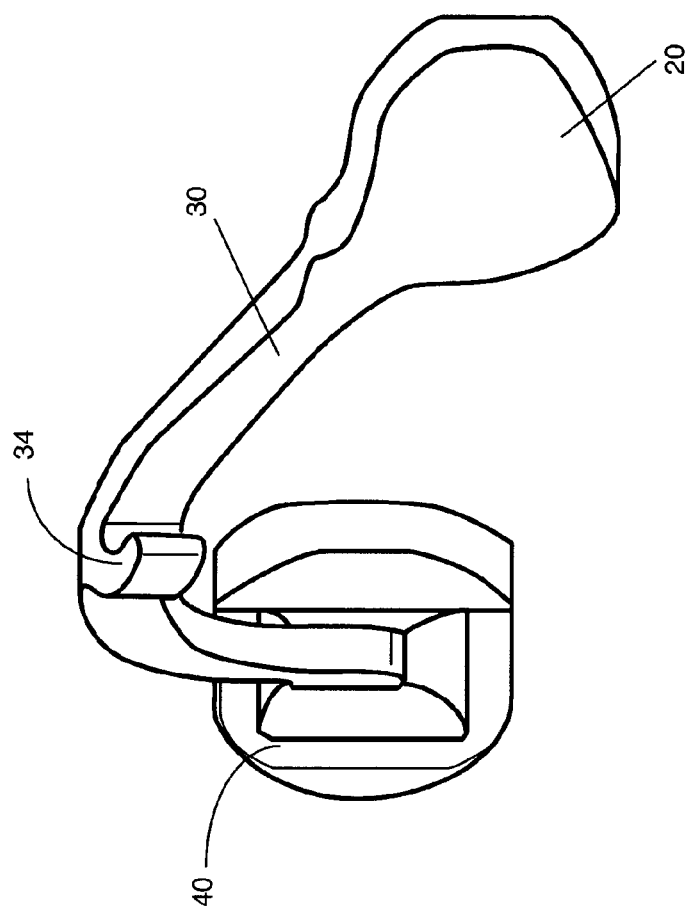

ORTHODONTIC MOLAR DISTALIZER

FIELD OF THE INVENTION

The present invention relates to the field of orthodontic appliances, and more particularly to an orthodontic molar distalizer.

BACKGROUND OF THE INVENTION

A malocclusion is a misalignment or incorrect relation between the two jaws, maxilla and mandible, and the teeth of the respective two dental arches. This is often referred to as a skeletal dysplasia characterized by overjet of the upper jaw and upper incisors, and often requires external headgear wear. There are generally three orthodontic terms to describe direction. Buccal-lingually means from the cheek side to the tongue side, respectively. Mesial-distally means from anterior to posterior or front to back. Occlusal-gingivally means from the bite side to the gum side. Malocclusion or malalignment of the bite, may be classified in one of three classes:

Class I: Neutrocclusion where the molar relationship of the occlusion is within normal limits. This is described as the maxillary (or upper) first molar mesial cusp fitting into the central groove of the mandiubular (or lower) first molar, and where the other teeth may have additional problems such as spacing, crowding, or vertical alignment issues such as over or under eruption.

Class II: Distocclusion where the mesiobuccal cusp tip of the upper first molar is anteriorly or forwardly positioned ahead of the mesiobuccal groove of the lower first molar and instead is anterior to it (often called a large "overbite" or technically a large overjet of the upper teeth anterior to the lower dentition). Again, the Class II malocclusion can be a result of the skeletal components of the upper jaw (maxillary segment) and/or lower jaw (mandibular segment) being malaligned or may additionally involve the dentition being maligned (above). Class II malocclusion also has two divisions where: division 1 has molar relationships such as Class II with the anterior teeth protruding; and division 2 has molar relationships like Class II but the central incisor teeth are retroclined and the lateral incisor teeth are seen anteriorly overlapping the centrals. It is important that the upper first molars are often and generally displaced and rotated mesially in Class II malocclusions taking up more space in the upper dental arch and contributing to the overjet, requiring correction.

Class III: Mesiocclusion is found in patients where the upper molars are placed not in the lower molar mesiobuccal groove but where the upper molar is located posteriorly to the lower molar central groove and often referred to as an underbite.

A distalizer applies to the treatment generally, of the upper teeth and upper jaw with a Class II overjet condition above but can also be used in the lower jaw or teeth by reversing the direction of force to be used in the correction of a Class III malocclusion.

Rotation and distalization of upper molars, with segmented archwires and orthodontic brackets (braces) in conjunction with Class II, up and down, inter-arch elastics with or without headgear or fixed functional appliances (which hold the lower jaw forward and downward) is not new. Distalizers have been used to correct one or more of the malocclusions described above for more than a century. One such distalizer is described in U.S. Pat. Nos. 6,976,839; 7,238,022; and 7,618,257, which all disclose an auxiliary element for the segmented distalization of the posterior upper jaw bone (maxilla) sector specifically from canine (or alternatively premolar) to molar in orthodontic treatment. The orthodontic appliance or element includes two components: a mesial segment and a distal segment. The mesial segment is composed of a rectangular anterior bonded canine attachment with its bonding base attached and fixed to the enamel of the canine with bonding resin adhesive. This canine attachment has a buccal protrusion at the anterior end, as a horizontal handle-like portion also directly attached to the canine dental unit that facilitates retention of a separate elastic element placed by the patient individually that is stretched down from the anterior end to a separate mandibular first molar attachment on each side so as to produce a diagonally-directed interjaw and up-down inter-arch force (between the maxillary and mandibular dental arches). This mesial component includes an elongated and arched rod extension that is part of, and firmly attached off of the distal end of the bonded canine attachment. The other end of the rod has a flat, ellipsoid member with a lateral and centrally located, hole, opening, or orifice for a permanent pin that largely permits rotation in the bucco-lingual direction.

The distal component is a smaller distally or (posteriorly) located element generally attached to the upper molar on each side of the upper jaw. The distal component is composed of a shoe-shaped receptacle located in the middle portion with an outside base that attaches to the tooth. The rod's spherical end member is coupled and permanently pinned with the shoe-shaped receptacle connecting the separate pin of the receptacle to the distal sphere-shaped end of the mesial segment. The permanently welded pin on either side of the shoe receptacle where the pin is located in the center of the shoe passes through the housing orifice of the disk-shaped rod end. A projecting pivot of the receptacle cavity of the distal segment is placed within a lateral slot of the mesial segment sphere to limit rotation of the spherical end member.

These distalizer mechanisms as described above are often complex and difficult to manufacture in initial three or four pieces with additional precision rotation pins through the rod connecting intricately to the distal component, and difficult to assemble. The projecting pivot and slot that limits rotation also increases difficulty in assembly. As two distalizers are used for balance in total, one on the left side and one on the right side of the upper jaw, a complex distalizer is cost prohibitive.

Moreover, prior art distalizers are characterized by lateral rotation pins that fix the mesial segment rod to the distal segment. These lateral pins result in the force on the mesial segment being applied, and being limited by the slot on the spherical-shape located specifically on the lateral lingual surface due to the coupling with the receptacle of the distal segment. From a top transverse perspective, this lingual lateral contact of the lateral receptacle pin within the lateral slot of the spherical-shape of the mesial segment also reduces the distance, and thereby moment of force (force× distance) from the centre of resistance of the molar, for prior art distalizers that is not ideal.

This reduction in moment of force above in prior distalizers was not favorable for three reasons in 3 dimensions. First, from a top occlusal view and in the transverse dimension there was a reduction in the amount of molar rotation distally because the distance, from the lingually-located, surface slot on the sphere to the centre of resistance of the molar, was shortened. This shortened distance transversely also applied to the other two centers of resistance of the dentition, and the maxilla. Furthermore, from a side buccal view, when a force was applied vertically and at a lower and thereby longer distance, at the level of the molar crown, the crown of the molar began to tip posteriorly. Later, after treatment and in retention, this resulted in the tipped molar crown re-aligning itself under the forward position of the root, known as orthodontic relapse. Third, from the side buccal view and in the horizontal dimension it was obvious when the elastic force was applied in prior distalizers from the anterior end of the mesial segment the elastic tipping force and the distance was longer and farther away from the center of resistance of the molar that also led to unstable molar tipping (as well as the canine tipping back posteriorly). When the pins were simply replaced by lateral crimping of the receptacle in manufacturing the distal segment of prior art distalizers, there was little change to the three adverse moments of forces in 3-dimensions above since similar lateral contact forces were specifically established, rather than purely distal forces directed at the back of the molar distal segment that are more desirable.

In addition, the other more common, and most clinically visible complications for patients that has been recognized, is that both upper canines become over-extruded, elongating the canine out of its tooth socket due to the elastic traction. This is in addition to unfavorable canine crown tipping that has been observed clinically (above). This poses a serious aesthetic and functional issue as interferences in the occlusion (bite) for patients with prior distalizers. Once upper canines have been over-extruded they are difficult to re-intrude because they are the longest rooted teeth in the maxilla.

It is ideal biomechanically to push the molar horizontally and vertically from as close to the centers of resistance of the molar, the entire dentition, and the maxilla that are all located closer to the upper part of the roots. For this reason, it is preferable and indicated in orthodontic biomechanics to translate the molar roots, or bodily move the molar posteriorly by pushing more distally (location of hook) in the horizontal dimension, and from a more gingival location that is closer vertically to the three centers of resistance, compared to prior distalizers.

Finally, the preferred method of molar distalization is to apply as direct a force to the molar as possible. (Conversely, to prevent canine over-extrusion it is ideal to avoid direct force on the canine at the anterior end). The method of distalizing the molar in prior distalizers is indirect vs. direct force because the prior art uses a force on the anterior end of the canine rather than the force being closer to the molar that requires movement. In the prior art this results in a domino-effect of indirect force from the canine crown, and canine root encased in bone, to the relatively straight bar mesiodistally and sphere (and to the obstructing two middle premolar teeth) resulting in a dissipated force to the molar tube.

Overall the goal is to prevent upper canine over-eruption while additionally, applying the inter-arch elastic force more posteriorly (distally) and higher (gingivally) to be closer biomechanically to the 3 centers of resistance for greater, bodily molar movement. Conversely, from a transverse perspective it is also ideal to push on the molar tube a further distance to the buccal away from the center of resistance of the molar. These improvements would also make canine and bodily molar movements more stable long-term, precluding relapse in retention.

International publication number WO 2017/070799 to Voudouris, the content of which is herein incorporated by reference in its entirety, is directed to an Orthodontic Bracket with a Sliding Molar Distalizer. Furthermore, international application number PCT/CA2017/000053 to Voudouris, the content of which is herein incorporated by reference in its entirety, is directed to an Orthopedic-Orthodontic Molar Distalizer.

As different individuals have different jaw sizes, distalizer rods need to be manufactured in different lengths so that the distalizer extends between the molar to distalize and a canine. Furthermore, depending on which molar is being distalized, a distalizer rod needs to have a different length. This causes a need to manufacture different distalizers for different molars and for different patients. The distalizers would either need to be custom made, or multiple distalizers having different rod lengths would be manufactured but only a number of those would be used by the patient.

SUMMARY OF THE INVENTION

In one aspect of the present invention, there is provided an orthodontic appliance for orthodontic treatment of a posterior maxillary sector extending from a mesial anchor tooth to a molar tooth unilaterally on the same side of the maxilla, comprising: a molar component including a bonding pad for affixing the molar component to a molar tooth, the molar component having a mesial opening to an interior of the molar component; a mesial anchor tooth attachment, including a bonding pad for affixing the attachment to a mesial anchor tooth; an elongate member, extending from the mesial anchor tooth attachment towards the molar component in a mesiodistal direction; a hook, slidable along the elongate member in a generally mesiodistal direction, for receiving a traction element for direct molar traction; a flexible biasing means coaxial with the rod and compressible between the slidable hook and the molar component. A distal end of the flexible biasing means engages at least one surface of the molar component to exert a distal force on the molar tooth when the flexible biasing means is compressed under a force of the traction element on the hook.

In one embodiment, the elongate member comprises a solid curved rod, the flexible biasing means comprises an external spring coaxial to the rod, the hook is provided on a sleeve slidable along the solid curved rod, and when traction force is applied to the hook, the sleeve slides distally engaging a mesial end of the external spring causing the spring to compress thus exerting distalizing force on the molar component.

In one embodiment, the elongate member comprises a hollow tube having a bore therethrough, the flexible biasing means comprises an internal spring in the bore, the internal spring having a distal end abutting a distal wall of the hollow tube, the hook is provided on a hook plunger slidably located in the bore and engaging a mesial end of the internal spring, and the hollow tube has a longitudinal slot within which the hook slides; and the mesial anchor tooth attachment is formed at mesial end of a mesial anchor tooth plunger slidable in the bore and having a distal end abutting a mesial end of the hook plunger.

In one embodiment, the hook plunger slides distally under force of the traction elastic and the mesial end of the hook plunger disengages from the distal end of the mesial anchor tooth plunger thus distalization force is applied to the molar tooth but not the mesial anchor tooth.

In another aspect of the present invention, there is provided: an orthodontic appliance for orthodontic treatment of a posterior maxillary sector extending from a mesial anchor tooth to a molar tooth unilaterally on the same side of the maxilla, comprising: a molar component including a bonding pad for affixing the molar component to a molar tooth, the molar component having a mesial opening to an interior of the molar component; an outer tube extending mesiodistally and having a distal molar end for engaging the molar component; an inner hollow tube slidably inserted inside the outer tube and having a tapered mesial end; and a mesial anchor tooth plunger slidably inserted inside the inner tube, the plunger having a mesial anchor tooth attachment at a mesial end thereof and a bar stop at a distal end thereof sized for cooperating with the tapered mesial end of the inner tube for retaining the mesial anchor tooth plunger inside the inner tube. The length of the appliance is adjusted by sliding the inner tube within the outer tube, and by sliding the mesial anchor tooth plunger within the inner tube.

In one embodiment, the length of the appliance is preserved by crimping on at least one of the outer tube and the inner tube.

In one embodiment, the orthodontic appliance further comprises: a first C-clasp slid on a mesial end of the outer tube and crimped for holding the outer tube and the inner tube in frictional engagement; and a second C-clasp slid on the tapered mesial end of the inner tube and crimped for holding the inner tube and mesial anchor tooth plunger in frictional engagement. The first and second C-clasps preserve the length of the appliance.

In one embodiment, the mesial anchor tooth plunger extends through the inner tube and into the outer tube, and the outer tube has an inner spring for flexibly biasing the distalizer in an extended configuration in the mesiodistal direction.

In one embodiment, the orthodontic appliance further comprises: V-shaped grooves lining an inside surface of the outer tube; and protrusive ends formed at the distal end of the inner tube sized to fit within the grooves for having a ratchet effect therebetween. The inner tube may be slid with the outer tube for adjusting then preserving the length of the appliance.

In yet another aspect of the present invention, there is provided an orthodontic appliance for orthodontic treatment of a posterior maxillary sector extending from a mesial anchor tooth to a molar tooth unilaterally on the same side of the maxilla, comprising: a molar component including a molar bonding pad for affixing the molar component to a molar tooth; a mesial anchor tooth pad, including a bonding pad for affixing the attachment to a mesial anchor tooth; a long rod, arched in the occlusal-gingival plane, extending at a first end thereof from the mesial anchor tooth attachment in a mesiodistal direction towards the molar component at a second end; and a hook, located on the rod, for attachment with a traction element for direct molar traction. The rod exerts a distal force on the molar tooth when under a force of the traction element on the hook, and the arched rod is offset from the mesial anchor tooth pad and from the molar bonding pad by a directed step-out at the first end in one of a buccal and a lingual direction.

In one embodiment, the long rod includes an aperture, and a bolt having a stem is inserted through the aperture and attached to the molar component; and when the rod is moved under traction force applied to the hook, a mesial wall of the aperture abuts against the stem causing the stem to tilt producing a turning force onto the molar component.

In one embodiment, the molar component has a threaded bore, and the bolt stem has a matching thread; and the bolt is attached to the molar component by threaded engagement of the bolt and the molar component.

In one embodiment, a distal end of the long rod ends in a washer having an aperture, the molar component has a threaded bore extending mesiodistally therein and open from a distal wall thereof, the long rod is placed such that the washer abuts the distal wall and the aperture is aligned with the threaded bore, and a threaded bolt having a matching thread as the threaded bore is fastened into the threaded bore of the molar component and tightened.

In one embodiment, a distal end of the long rod ends in a washer having an aperture, the molar component has a bore extending mesiodistally therein and open from a distal wall thereof, the long rod is placed such that the washer abuts the distal wall and the aperture is aligned with the threaded bore, and a bolt is inserted into the bore of the molar component and welded therein.

In one embodiment, the molar component comprises a tube having a rectangular cross section including a mesial opening defined by mesial edges, and a distal wall having an elongated aperture, and the long rod has a cam extending buccally or lingually therefrom and positioned to engage one of the mesial edges for applying distalization force on the molar component when the rod is under traction force, and the rod has a distal end extending through the elongated aperture.

In one embodiment, the distal end of the rod has a bent portion for retaining the rod within the molar tube.

In one embodiment, the orthodontic appliance, further comprises a wedge of material placed between the molar component and the molar bonding pad such that an angle is formed between the molar component and a molar tooth it is attached thereto to produce molar rotation.

In one embodiment, the molar component comprises a tube having a mesial opening defined by mesial edges, and a distal wall having an elongated aperture; and the long rod has a push flange extending buccally or lingually therefrom and positioned to engage one of the mesial edges for applying distalization force on the molar component when the rod is under traction force, and the rod has a distal end extending through the elongated aperture.

BRIEF DESCRIPTION OF THE DRAWINGS

Embodiments of the present invention will be presented with reference to the attached drawings in which:

FIG. 10 is mesial three quarter perspective view of a variant of the molar distalizer of FIG. 9A;

DETAILED DESCRIPTION OF THE EMBODIMENT

Figure 1A:
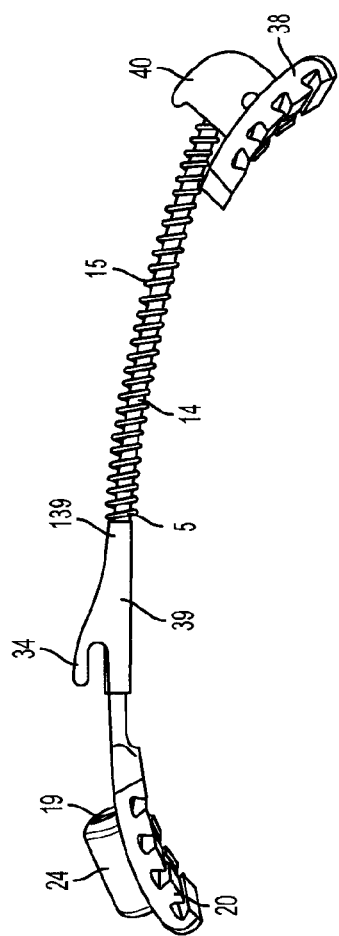
FIG. 1A is an occlusal perspective view of a molar distalizer, with a spring, in accordance with an embodiment of the present invention.

Embodiments of the present invention will now be presented by way of example only and not limitation with reference to the attached drawings.

In one aspect of the present invention there is provided an orthodontic appliance ("orthodontic distalizer", "molar distalizer", "orthodontic molar distalizer") for orthodontic treatment of a posterior maxillary sector extending from a mesial anchor tooth to a molar tooth unilaterally on the same side of the maxilla. The distalizer may be applied on either the buccal or lingual side of the maxilla.

With reference to FIGS. 1A-1D and FIGS. 2-3, there is provided an orthodontic molar distalizer having a molar component such as molar tube 40 including bonding pad 38 for affixing the molar component to a molar tooth. A mesial anchor tooth attachment 20 includes a bonding pad for affixing the attachment to a mesial anchor tooth such as a canine. An elongate member, such as rod 14 or hollow tube 280 extends from the mesial anchor tooth attachment 20 towards the molar component (tube) 40 in a mesiodistal direction, and engages with the molar component at a distal end of the elongate member. The mesial anchor tooth attachment 20 is generally flat; however it may have attached thereto or formed thereon an orthodontic tube, such as orthodontic tube 24 (shown in FIGS. 1A-1D). Orthodontic tube 24 may have an archwire slot opening 19 suitable for receiving an archwire (not shown). The elongate member may be stepped up with respect to the mesial anchor tool attachment and the molar component. Advantageously, this permits the positioning of a number of orthodontic brackets (not shown) on teeth intermediate the mesial anchor tooth and the molar to which the molar component is attached. Therefore an archwire can extend through slot opening 19 mesiodistally and into the intermediate orthodontic brackets. The brackets, archwire, and orthodontic tube with slot all form a solid anchor to prevent the complication of canine over-extrusion. The distal end of the elongate member has a molar end suitable for engaging a molar component such as molar tube 40. The molar end may be spherical, ellipsoidal, or puck-shaped, and the interior of the molar component is sized and shaped for receiving the molar end of the elongate member. A hook 34 is slidably positioned with respect to the elongate member in the mesiodistal direction such that when traction force is applied to the hook generally in the distal direction, the hook slides distally towards the molar component. A flexible biasing means, such as spring 15, is provided externally and mesiodistally along rod 14 between hook 34 and the molar component 40. Alternatively, spring 115 is provided internally inside hollow tube 280 between plunger 140 on which hook 34 is formed, and the molar end 150. Accordingly when the hook 34 is slid distally with plunger 140 the flexible biasing means are compressed exerting some distalizing force on the molar end, and in turn on the molar component. As the flexible biasing means are compressed further, they reach a point where further compression applies more distalizing force to the molar component, in the direction denoted by arrow 299. Advantageously, this prevents canine over-eruption since the canine is not moved until sufficient distalization has occurred to the molar and the flexible biasing means is fully compressed. Additionally the positioning of hook 34, particularly when the flexible biasing means is compressed, closer to the center of the resistance of the molar both vertically and horizontally, contributes to lowering the chance of canine extrusion.

Figure 1B:
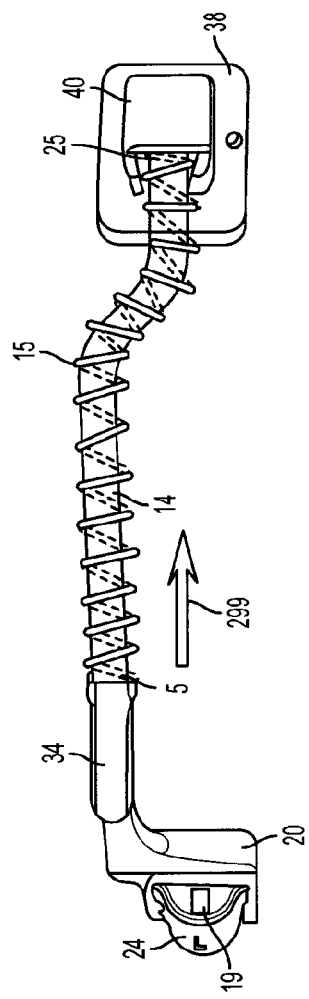
FIG. 1B is a side (buccal or lingual) perspective view of the molar distalizer of FIG. 1A.
Figure 1C:
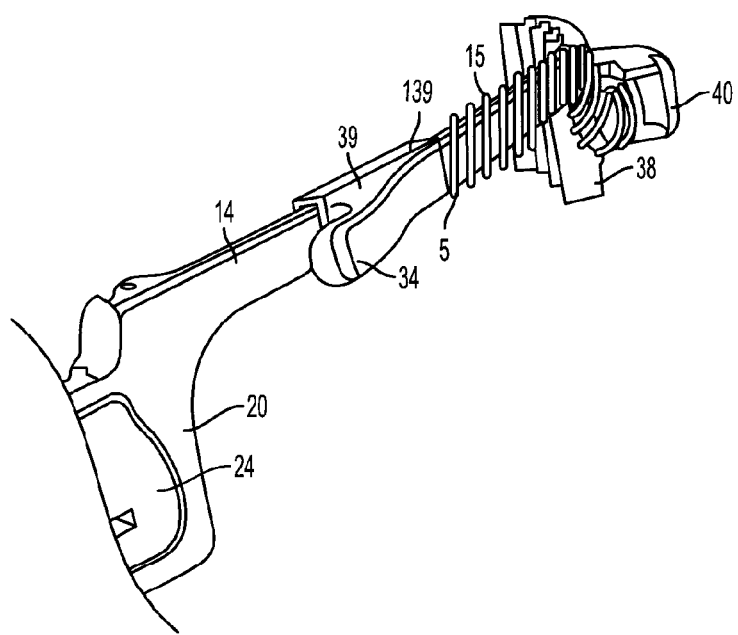
FIG. 1C is a side (buccal or lingual) three-quarter perspective view particularly of the mesial aspect of the molar component of the distalizer of FIG. 1A in distalizing mode.
Figure 1D:
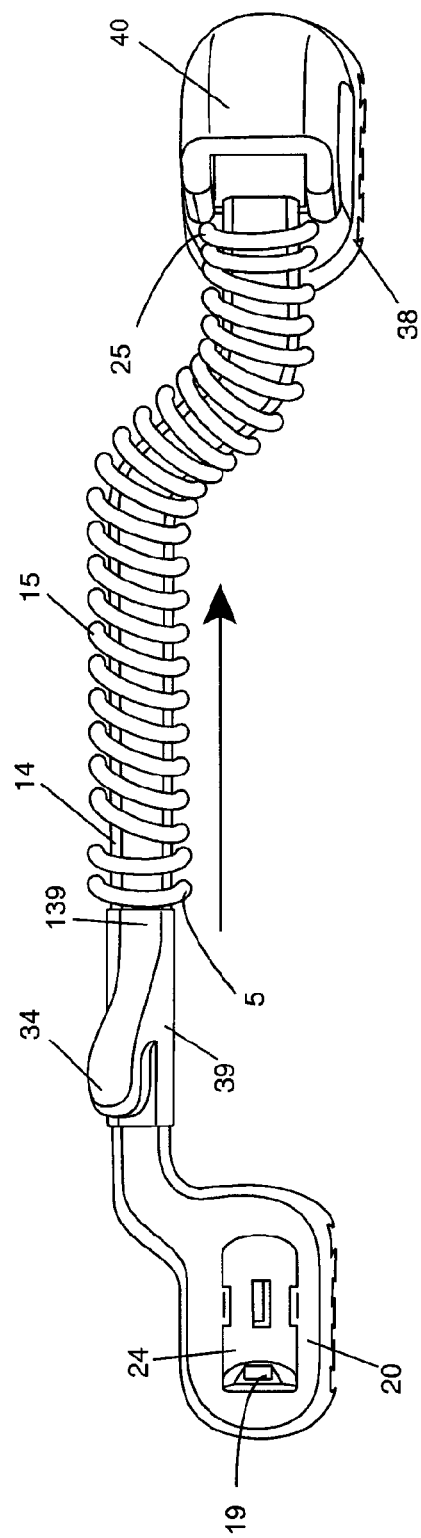
FIG. 1D is a side (buccal or lingual) view of the molar distalizer of FIG. 1A.

In one embodiment, shown in FIGS. 1A-1D, a sleeve 39 is positioned around rod 14, and is slidable therealong in the mesiodistal direction. The sleeve 39 has a hook 34 formed thereon or attached thereto. Hook 34 is suitable for receiving a traction force elastic (not shown) for imparting force on sleeve 39 to slide distally along rod 14 towards molar tube 40, in the direction of arrow 299 of FIG. 1B. As sleeve 39 is slid along rod 14, as shown in FIG. 1B, a distal end 139 of sleeve 39 engages a mesial end 5 of external spring 15 thus causing spring 15 to compress exerting distalizing force on molar tube 40 by a distal end 25 of spring 15. In one embodiment, sleeve end 139 and mesial end 5 may be welded together. As the spring 15 is further compressed, as shown in FIG. 1C, spring 15 exerts higher resistance force in the direction opposite to that of arrow 299, thus preventing sleeve 39 from sliding further distally along rod 14. Accordingly, further force exerted by the traction elastic on sleeve 39 via hook 34 results in the entire distalizer being moved distally (in a posterior direction) including the molar tube 40.

Figure 2:
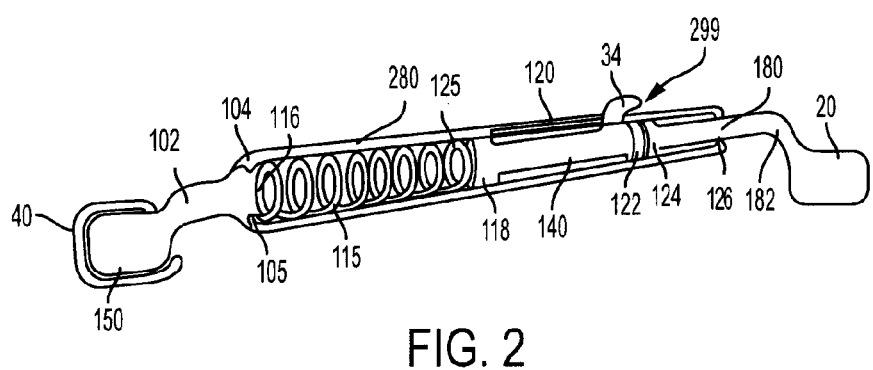
FIG. 2 is a side (buccal or lingual) partially sectional view of a molar distalizer with a stepped-up tube in accordance with another embodiment of the present invention.
Figure 3:
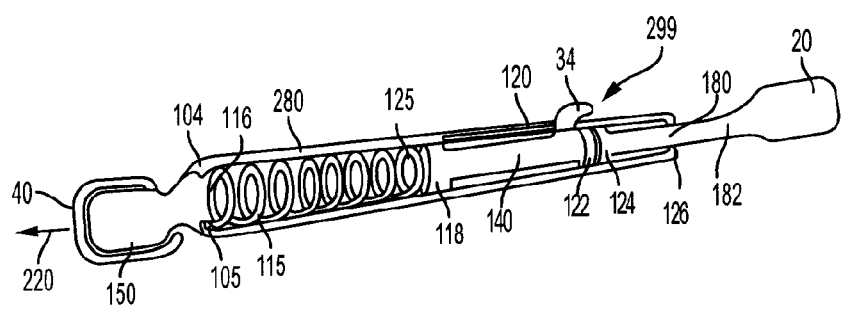
FIG. 3 a side (buccal or lingual) sectional perspective view of a molar distalizer similar to the molar distalizer of FIG. 2 but with a straight tube extending mesiodistally, in accordance with yet another embodiment of the present invention.

In another embodiment, shown with reference to FIGS. 2-3, an orthodontic distalizer is provided in which the elongate member extending between the molar component and the mesial anchor tooth attachment is in the form of a hollow tube 280 having a bore therethrough. Hollow tube 280 extends mesiodistally between mesial anchor tooth attachment 20 and molar tube 40. In one embodiment, shown in FIG. 2, tube 280 features a molar end 150, connected thereto via step-down portion 102, for engaging a molar tube 40 for exerting distalizing force in the direction of arrow 299. In another embodiment, shown in FIG. 3, molar end 150 is connected to tube 280 by a straight portion. In one embodiment, hollow tube 280 has two internal stops 104 and 105 for engaging a distal end 116 of a flexible biasing means in the form of internal spring 115 located inside the hollow interior (or bore) of hollow tube 280. In another embodiment (not shown), distal end 116 abuts a distal wall of the hollow interior of hollow tube 280. In one embodiment, molar end 150 has the shape of a puck. Other molar end shapes are contemplated and corresponding interior shapes of the molar component are contemplated. Molar end 150 may be welded to hollow tube 280 or formed integrally therewith. A hook bar plunger 140 is slidably located in the hollow interior of hollow tube 280 such that a distal end 118 thereof engages the mesial end 125 of spring 115 for compressing the spring 115 under force of a traction elastic on hook 34. Hook bar plunger 140 has a mesial end or hook bar stop 122 opposite distal end 118. Hook bar plunger 140 features a hook 34 extending radially therefrom. The hollow tube 280 features a longitudinal slot 120 sized and shaped for receiving hook 34 and for permitting hook bar plunger 140 to slide mesiodistally inside hollow tube 280. Longitudinal slot 120 may be gingival and hook 34 may be oriented gingivally for sliding within longitudinal slot 120. Alternatively, (not shown) longitudinal slot 120 may be buccal (or lingual) and hook 34 may be oriented buccally (or lingually) for sliding within longitudinal slot 120. A mesial anchor tooth plunger, such as canine plunger 180 has a mesial end comprising mesial anchor tooth 20 for engaging a mesial tooth such as a canine. In one embodiment, shown in FIG. 2, plunger 180 has a portion 182 which is stepped up with respect to mesial tooth attachment 20. In another embodiment, shown in FIG. 3, portion 182 of plunger 180 is straight. Canine plunger 180 also comprises a canine plunger stop 124 at a distal end thereof. The canine plunger stop 124 is sized and shaped to engage (or abut) hook bar stop 122 of hook bar plunger 140. Hollow tube 280 features an aperture 126 at the mesial end for slidably retaining canine plunger 180 within the hollow tube 280.

When a traction force elastic is connected to hook 34 thus applying distalization force on hook bar plunger 140 and moving it in the direction of arrow 299, hook bar stop 122 of hook bar plunger 140 is slid distally away from canine plunger stop 124. Additionally, distal end 118 of hook bar plunger 140 exerts force on spring 115 causing it to initially compress. Since the distal end 116 of spring 115 engages internal stops 104 and 105, hollow tube 280 is moved distally in the direction of arrow 299 and towards the molar tooth. The molar end 150 engages molar tube 40 thus applying distalization force to the molar tooth. However, since the canine attachment is part of plunger 180 which does not move distally with plunger 140 and tube 280, no distalization force is applied to the canine. As the hook bar plunger 140 is slid distally inside hollow tube 280, bar hook 34 slides in longitudinal slot 120. Advantageously, the molar is distalized by action of molar end 150 on molar tube 40, but no canine over-eruption occurs since there is little force on the canine at the time. As the hook bar plunger 140 is slid further towards the molar tooth a number of possible effects may take place. In one embodiment, the spring 115 cannot be compressed further and additional traction force on hook 34 causes the hollow tube to move distally and exert more force on the molar tube 40. In another embodiment, spring 115 may still have some room for compression, but hook 34 may abut a distal end of tube slot 120 thus preventing further compression of the spring by hook bar plunger 140. In this embodiment further force on the traction elastic moves the hollow tube 280 further distally without applying force on the canine. This allowance of the canine in a relatively stationary position without being pulled-back, is a unique improvement over the prior art because it avoids posterior canine tipping, and prevents resistance from the long canine root when distalizing molars. In one embodiment, the canine plunger 180 and canine plunger stop 124 may be dimensioned such that canine bar stop 124 engages the mesial end of hollow tube 280 at aperture 126, thus eventually pulling canine plunger 180 and exerting force on the canine tooth via mesial anchor tooth attachment 20. Accordingly, the distalizer provides flexibility as to the point at which force is applied to the canine in addition to the molar.

Figure 4:
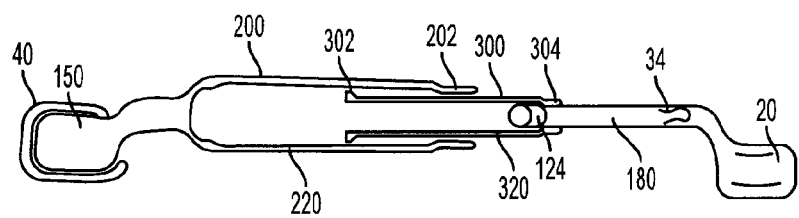
FIG. 4 is a side (buccal or lingual) partially sectional view of an extendable 2-tube telescopic molar distalizer with a stepped-up bar-tube area in accordance with yet another embodiment of the present invention.
Figure 5:
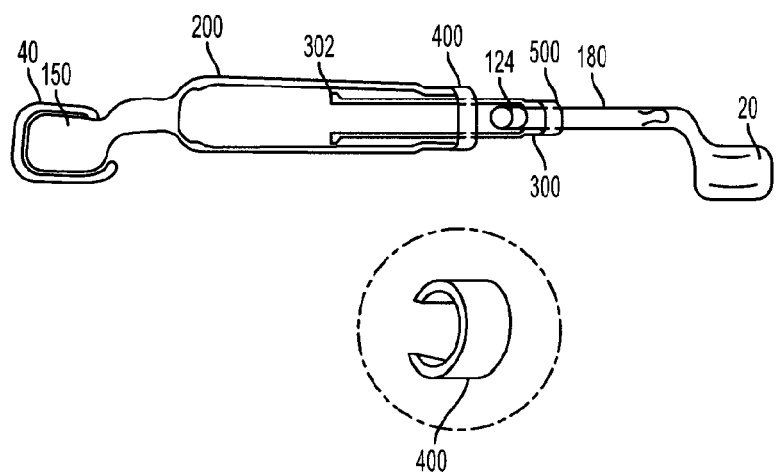
FIG. 5 is a side (buccal or lingual) partially sectional view of the extendable 2-tube, telescopic molar distalizer of FIG. 4 featuring additionally a magnified view of a crimping C-clasp.
Figure 6:
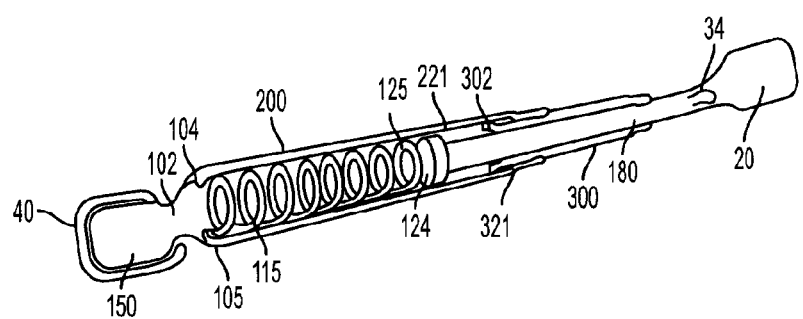
FIG. 6 is side (buccal or lingual) partially sectional perspective view of a telescopic molar distalizer similar to the molar distalizer of FIG. 4 with a longer bar-tube extending mesiodistally and featuring an internal spring, in accordance with yet another embodiment of the present invention.

FIGS. 4-6 depict a molar distalizer featuring a telescopic design. As will be shown, the telescopic design provides flexibility for an operator to form different lengths for different sized patients' maxillary canine to molar distances. Accordingly, the operator does not have to purchase approximately 6 different sized distalizers per side as is customary in the prior art.

With reference to FIG. 4, a molar distalizer is shown having an outer tube 200 extending mesiodistally and having a distal molar end 150 for engaging a molar tube 40 as discussed earlier. An inner tube 300 is slidably inserted inside outer tube 200. In one embodiment, outer tube 200 has a tapered mesial end 202 and inner tube 300 has a protrusive end 302 which, in cooperation with tapered end 202 prevents the accidental removal of tube 300 from tube 200. A mesial anchor tooth plunger, such as canine plunger 180 is slidably inserted in a hollow interior of inner tube 300.

Canine plunger 180 features a mesial anchor tooth attachment 20 at a mesial end thereof and a canine bar stop 124 at a distal end. Canine plunger 180 features a bar hook 34 as described earlier. Tube 300 has a narrower, step-tapered mesial end 304 sized for cooperating with the canine bar stop 124 for retaining canine plunger 180 in tube 300. Advantageously, tube 300 may be slid inside tube 200, and canine plunger 180 may be slid inside inner tube 300 to adjust the length of the distalizer to form different lengths for different sized patients' maxillary canine to molar distances. Once the size of the distalizer is determined and adjusted, crimping may be used to prevent further sliding of the tubes and the plunger with respect to one another thus preserving the adjusted distalizer length. For example, the outer tube 200 may be crimped to the inner tube 300 by crimping action at crimp point 220. Similarly, the inner tube 300 may be crimped onto the canine plunger 180 by crimping action at crimp point 320. Advantageously, a single distalizer can be adjusted in size to match any patient's anatomy, and the need for purchasing different sized distalizer is averted.

FIG. 5 depicts the distalizer of FIG. 4 with crimping C-clasps. C-clasp 400 is used to hold the outer tube 200, inner tube 300 at a fixed length, whereas C-clasp 500 is used to hold the inner tube 300 and the canine plunger 180 at a fixed position relative to one another once the length of the distalizer is adjusted. Inner tube 300 is slid inside outer tube 200 until a desired length is reached. Then C-clasp 400 is slid onto the tapered mesial end 202 of outer tube 200. C-clasp 400 is then crimped to hold outer tube 200 and inner tube 300 in frictional engagement such that they do not slide with respect to one another. To further adjust the distalizer length, the canine plunger 180 is slid with respect to the inner tube 300, until a desired distalizer length is reached. Then C-clasp 500 is slid onto the tapered mesial end 304 of inner tube 300. C-clasp 500 is crimped to hold inner tube 300 and canine plunger 180 in frictional engagement such that they do not slide with respect to one another. Advantageously, a single distalizer can be adjusted in size to match any patient's anatomy and the need for purchasing different sized distalizer is averted.

FIG. 6 depicts a similar distalizer as FIG. 4 with the exception that there is flexible biasing means which bias the distalizer in an extended configuration. For example, inner spring 115 is positioned inside outer tube 200 where at a distal end thereof it abuts stops 104 and 105 formed at the distal end of the interior of outer tube 200. Plunger 180 of FIG. 6 may be longer than corresponding plunger 180 of FIG. 3 so it can extend further into outer tube 200. Plunger bar stop 124 of canine plunger 180 is affixed to, or abuts the mesial end 125 of spring 115. Accordingly, the distalizer is flexibly biased in a long (extended) configuration in the mesiodistal direction, but may be adjusted prior to a particular patient's anatomy. For example, inner tube 300 may be slid inside outer tube 200 to adjust the length and shorten the distance that the canine plunger 180 may travel inside outer tube 200. Bar stop 124 is biased mesially by spring 115, and may also travel further in the mesial direction if plunger 180 is pulled in the mesial direction. However, if inner tube 300 is slid distally inside of outer tube 200, bar stop 124 abuts end 302 of inner tube 300 thus limiting the length of the distalizer. Once bar stop 124 abuts end 302, the outer tube 200, inner tube 300, and plunger 180 may be crimped together so that the distalizer is maintained at the selected length. In another variation, the outer tube 200 is crimped at crimp point 221, which is mesial of bar stop 124. This prevents bar stop 124 (and thus canine plunger 180) from moving mesially. Additionally, the outer tube 200 and inner tube 300 may be crimped together at crimp point 321 to prevent inner tube 300 from sliding mesially once the distalizer length has been adjusted.

Figure 7:
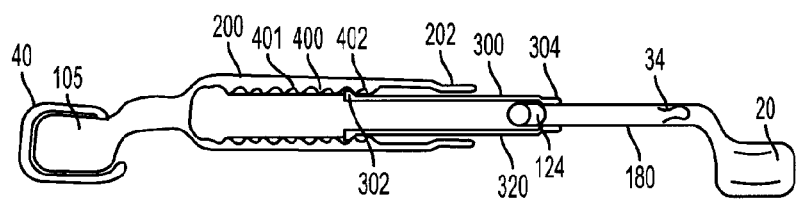
FIG. 7 is a side (buccal or lingual) partially sectional perspective view of the extendable 2-tube, telescopic molar distalizer of FIG. 4 featuring a plurality of grooves formed on an inside surface of an outer tube to couple with distal protrusions on a distal aspect of an inner tube, in accordance with another embodiment of the present invention.
Figure 8:
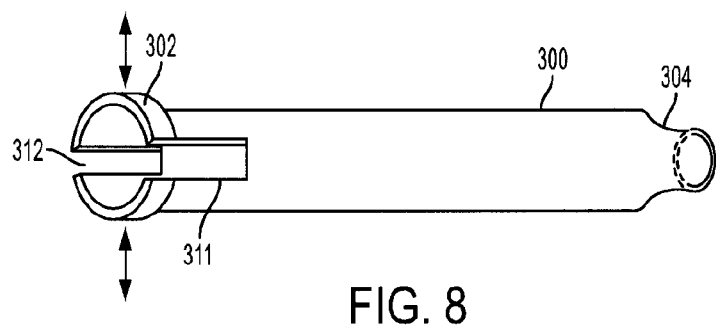
FIG. 8 is a side (buccal or lingual) three-quarter, perspective view of an inner tube of the distalizer of FIG. 7, showing the distal protrusions and a pair of cutout grooves for flexibility.
Figure 9A:
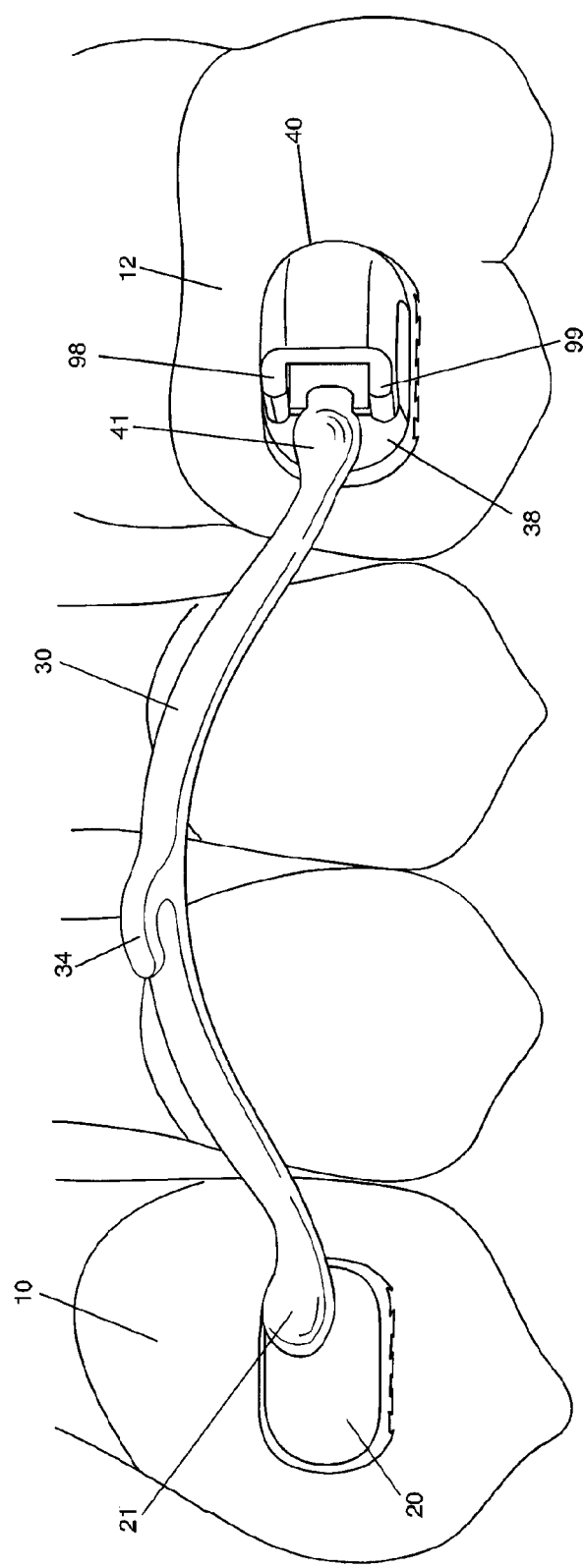
FIG. 9A is a side (buccal or lingual) perspective view of a molar distalizer having an arched rod attached between a canine and a first molar of a patient's maxilla, in accordance with an embodiment of the present invention.
Figure 9B:
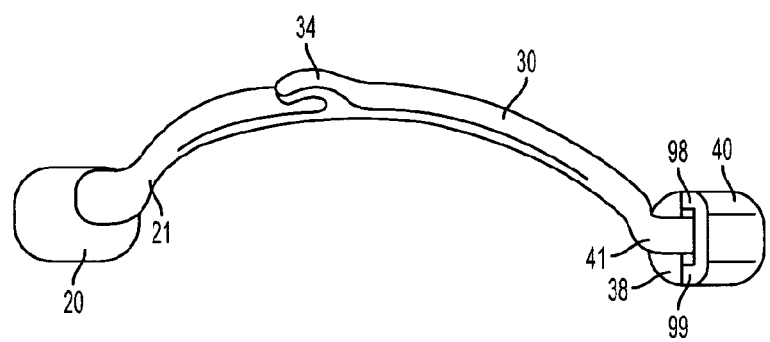
FIG. 9B is a side (buccal or lingual) view of the molar distalizer of FIG. 9A.
Figure 9C:
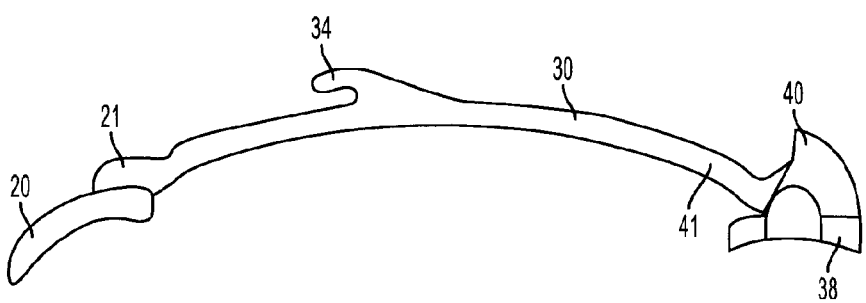
FIG. 9C is an occlusal view of the molar distalizer of FIG. 9B.

FIG. 7 depicts the distalizer of FIG. 4 with a series of inside or internal peak protrusions 400, and valleys or grooves 401 forming V-shaped grooves, generally lining the interior aspect of the outer tube 200. In FIG. 8 the entire inner tube 300 is shown in a three-quarter view and in 3 dimensions demonstrating specifically the distal aspect of the inner tube 300 that contains the protrusive ends 302 to fit and lock into the generally V-shaped grooves 401 lining the inside surface of the outer tube 200 for a ratchet-effect shown in FIG. 7. This serves to lock the inner tube 300 into the outer tube 200 at a specified distance measured for patients for distalizer length. The protrusive ends 302 of the inner tube 300 can additionally be guided by up to two relatively flat guide planes 402 located on either side buccal and lingual of the V-shaped valleys to close them off laterally within the outer tube 200. This prevents rolling of or rotation of the protrusive ends 302 when inserted within the interior of the outer tube 200. Once the length of the distalizer is configured, the inner tube 300 may be crimped at bar stop 124 or at crimp point 320 to prevent canine plunger 180 from sliding distally into inner tube 300. Alternatively, the inside of inner tube 300 may also feature protrusions and grooves similar to those of the outer tube 200, and plunger stop 124 may engage those protrusions in a ratchet effect or friction fit. The canine plunger bar stop 124 may be made more flexible with partial rectangular and or ovoid shaped cutouts at least at the buccal and lingual sides for plunger flexibility to allow the plunger bar stop 124 to flex and fit over the peaks of the inner tube 300 (not shown) using a ratchet effect. The ratchet force between protrusive ends 302 and protrusions 400 is generally strong enough to resist the sliding of inner tube 300 into outer tube 200 under force of traction elastic applied to inner hook 34.

FIG. 8 shows the distal aspect of the inner tube 300 with two horizontal cutouts 311 and 312 in a generally rectangular, and/or ovoid shape, located at least at the buccal and lingual aspects of the inner tube 300 to provide the necessary flexibility of the inner tube protrusions 302 to flex over the internal peak protrusions 400 when inner tube 300 is inserted and pushed through the outer tube 200 to make the distalizer shorter in length, for example. Advantageously, the outer tube 200 and inner tube 300, and canine plunger 180 are maintained at a fixed position relative to one another once the length of the distalizer is ratcheted as described above.

With reference to FIGS. 9A-9C and FIG. 10, an upper molar distalizer is shown having an arched rod 30 extending between a mesial anchor tooth attachment 20 and a molar tube 40. The rod 30 may have a circular arch, elliptical arch, or a door-handle shaped arch. The arched rod 30 is curved such that the top portion thereof is gingival of the ends 21 and 41. Advantageously, this leaves room under the rod so that premolar brackets (not shown) may be attached to the two premolar teeth between a canine 10 and a first molar 12, when the distalizer is attached to the canine 10 and the first molar 12. The premolar brackets may receive an archwire therethrough. The premolar brackets, combined with the archwire and a canine orthodontic tube or bracket (as an optional addition, not shown), form a solid anchor to prevent the complication of canine over-extrusion. While other saddle-shaped step up and step down arrangements in the vertical dimension are also contemplated to provide room for the premolar brackets, it has been found that a smoother, curved or arched structure for the rod has the added advantage in that plaque does not accumulate thereon and the vertical curvature of the rod is more suitable for patient comfort. If the distalizer is applied to the buccal side of the maxilla, the curved rod 30 is buccally offset from the mesial anchor tooth attachment 20 by a buccally directed step-out at rod end 21. Similarly, the curved rod 30 is buccally stepped-out from the molar bonding pad 38 by a buccal step-out at rod end 41. Accordingly, the curved rod 30 is buccally offset with respect to the maxilla when the distalizer is attached to a canine 10 and upper molar 12. In another embodiment, the distalizer may be applied to the lingual side of the maxilla, in which case the curved rod 30 is lingually stepped-out from the molar bonding pad 38, and lingually stepped-out from the mesial anchor tooth attachment 20. Advantageously, the curved rod 30 does not touch the gum thus preventing gingival impingement, particularly in teens.

A hook 34 is located at the middle portion of the curved rod 30. In one embodiment, the hook 34 is at the highest (or gingival most) point of rod 30. The hook 34 is shaped for receiving a traction elastic that imparts distalization force on the distalizer. The distalization force has a horizontal component causing the distalizer rod to push directly to the distal against the molar tube 40. The positioning of the hook 34 at the highest point in the middle of the distalizer places it close to the center of resistance (CR) of the maxilla, CR of the dentition, and CR of the first molar 12. This improves the opportunity for more bodily translation of the upper molar 12 to reduce molar tipping. The hook 34 positioning additionally improves the restriction of maxillary growth by being closer to the CR of the maxilla when heavy traction force is imparted directly on hook 34 by the traction element to restrict maxillary growth while the lower jaw grows forward for overjet correction.

The rod 30 may have spherical, oval, or ellipsoid-shaped engagement end (not shown) at the molar end. The engagement end is sized and shaped to enter the molar tube 40 via a mesial opening and to fit inside the interior of the molar tube 40. In one embodiment, an upper (gingival) claw 98 and a lower (occlusal) claw 99 located at the mesial end of the molar tube are crimped after the engagement end has been inserted into the molar tube 40 for locking the engagement end inside the molar tube 40. In another embodiment (not shown) the gingival and/or occlusal walls of the molar tube 40 may be crimped or deformed at the mesial side for locking the engagement end inside the molar tube 40. To distalize molar 12, the distalizer, including rod 30, is moved posteriorly (distally) under force of a traction element connected to hook 34. The engagement end presses distally against the distal wall of molar tube 40. The molar tube 40, in turn, imparts rotational distalization force on molar 12.

With reference to FIGS. 11A-11C and 12-15, a molar distalizer having a cantilever design is presented, in accordance with another embodiment of the present invention. The distalizer has an arched rod 30 in the vertical (occlusal-gingival) dimension, the rod having a mesial anchor tooth attachment 20 at a mesial end thereof, side (buccal or lingual) step-out end portions 21 and 41, and hook 34 similar to rod 30 of the embodiment of FIGS. 9A-9C and 10. However, rod 30 of the present embodiment includes an elongated or elliptical aperture 39. The aperture 39 is sized and shaped for accommodating a stem 105 of mushroom bolt 100 as it is moved and tilted under distalization action as described below.

Figure 13:
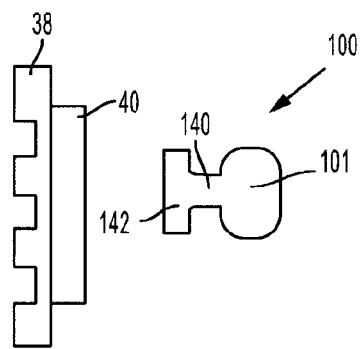
FIG. 13 is a side view of a mushroom bolt and molar bonding pad that may be welded to one another, in accordance with an embodiment of the present invention.

In one embodiment, shown with reference to FIG. 13, to assemble the distalizer, the stem 105 is inserted through aperture 39 of rod 30 and then a lingual end of stem 140 is welded onto the buccal surface of molar component 40 which is affixed to the molar via molar bonding pad 38. In this case the base 142 of the mushroom bolt 100 is elongated so as to pass through aperture 39 during assembly and then the bolt 100 may be rotated 90 degrees so that the base is held in place and bolt 100 cannot be cannot be easily disengaged from rod 30, prior to being welded to molar component 40.

Figure 14:
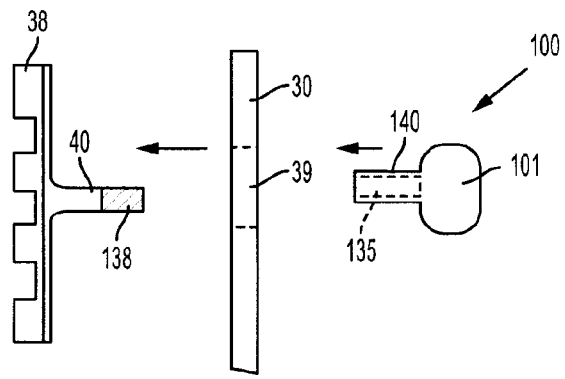
FIG. 14 is a side view of a molar bonding pad having a threaded bolt, a distalizer rod having an aperture, and a mushroom bolt having a threaded bore, prior to being assembled together, in accordance with another embodiment of the present invention.
Figure 15:
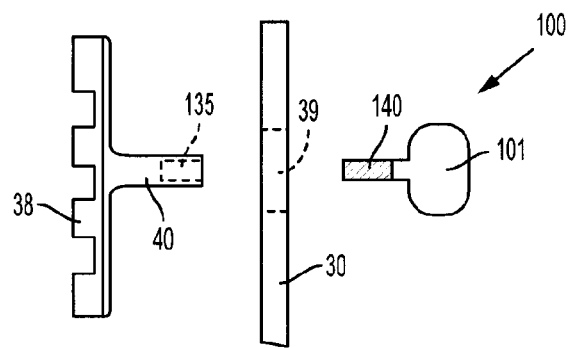
FIG. 15 is a side view of a molar bonding pad having a threaded bore, a distalizer rod having an aperture, and a mushroom bolt having a threaded bolt, prior to being assembled together, in accordance with yet another embodiment of the present invention.

In another embodiment, shown with reference to FIG. 14, stem 140 of mushroom-shaped bolt 100 is in the form of a socket having a threaded bore 135. Molar component 40 has a threaded bolt 138, having a thread compatible with threaded bore 135 of socket stem 140, extending therefrom. To assemble the distalizer, the rod 30 is placed over threaded bolt 138 such that bolt 138 extends through aperture 39. Then socket stem 140 of mushroom-shaped bolt 100 is screwed onto the threaded bolt 138 and tightened thereto such that head 101 of mushroom socket 100 keeps the rod in place. FIG. 15 depicts a similar socket design to FIG. 14 except that it is the molar component 40 that provides a socket having a threaded bore 135, while the mushroom bolt stem 140 has a thread compatible with the threaded bore 135. In yet another embodiment (not shown), the mushroom-shaped bolt 100 may be brazed in position.

Figure 11A:
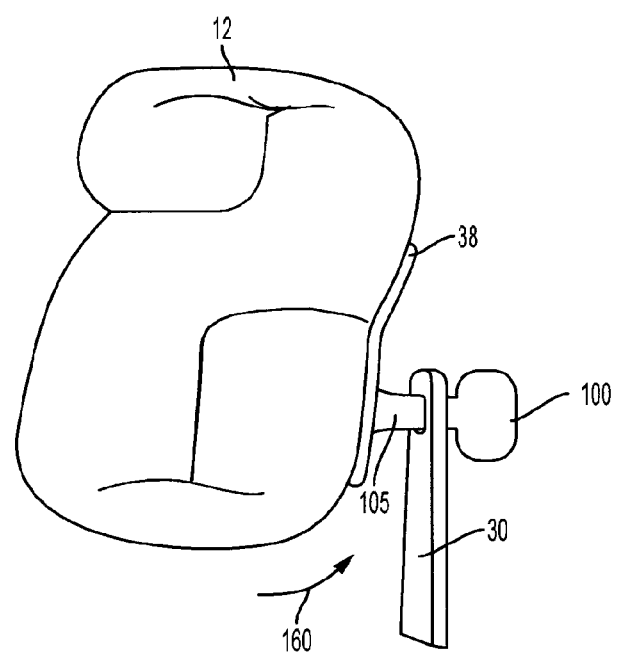
FIG. 11A is a partial occlusal bottom view of a molar distalizer having a cantilever molar side end, applied to a molar tooth, in accordance with an embodiment of the present invention.
Figure 11B:
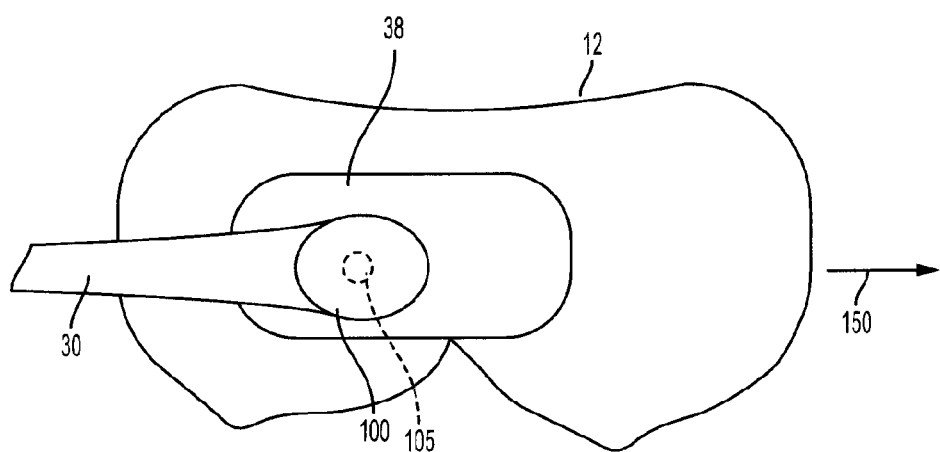
FIG. 11B is a partial side (buccal or lingual) view of the molar distalizer of FIG. 11A, applied to a molar tooth.
Figure 11C:
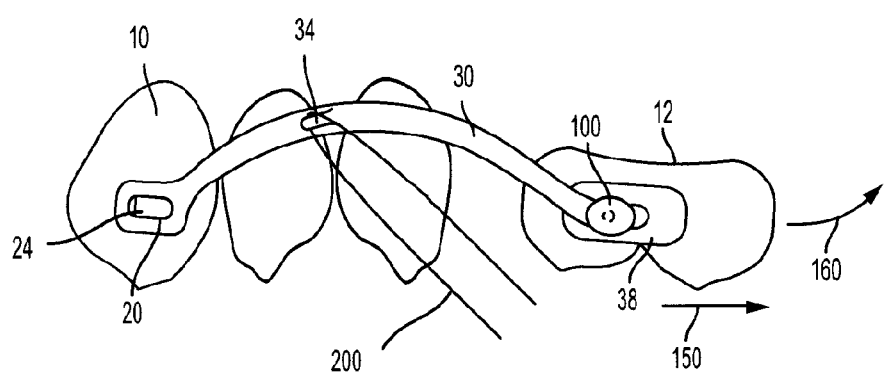
FIG. 11C is a side (buccal or lingual) view of the molar distalizer of FIG. 11A attached between a canine and a first molar of a patient's maxilla, and having a traction elastic applying traction force thereon.
Figure 12:
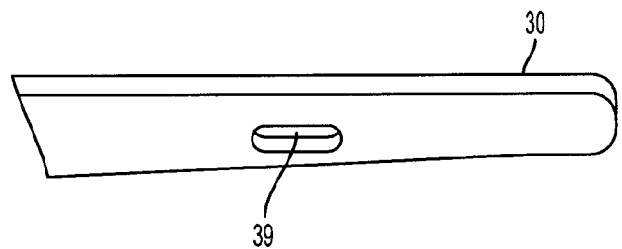
FIG. 12 is partial perspective view of the rod of the molar distalizer of FIG. 11A and the aperture therein.

Turning back to FIGS. 11A-11C, the operation of the distalizer is described herein. Under force of a traction element (e.g. an elastic) 200 shown in FIG. 11C, a horizontal force component 150 causes the rod 30 to be moved distally towards the molar 12. As such the mesial inner wall of aperture 39 abuts against the stem 105 of mushroom bolt or socket 100 and pushes it distally. The stem 105 begins to tilt since it is fixedly attached to molar component 40 as described above. This produces a moment or turning force, denoted by the directional arrow 160 in FIG. 11C, onto molar component 40 which is attached to molar 12 causing it to be rotated. FIG. 11C shows an optional orthodontic tube 24 which, in conjunction with premolar brackets (not shown) having an archwire extending therethrough and attached at one end to the orthodontic tube 24, form a solid anchor to prevent the complication of canine over-extrusion during molar distalization.

Figure 16A:
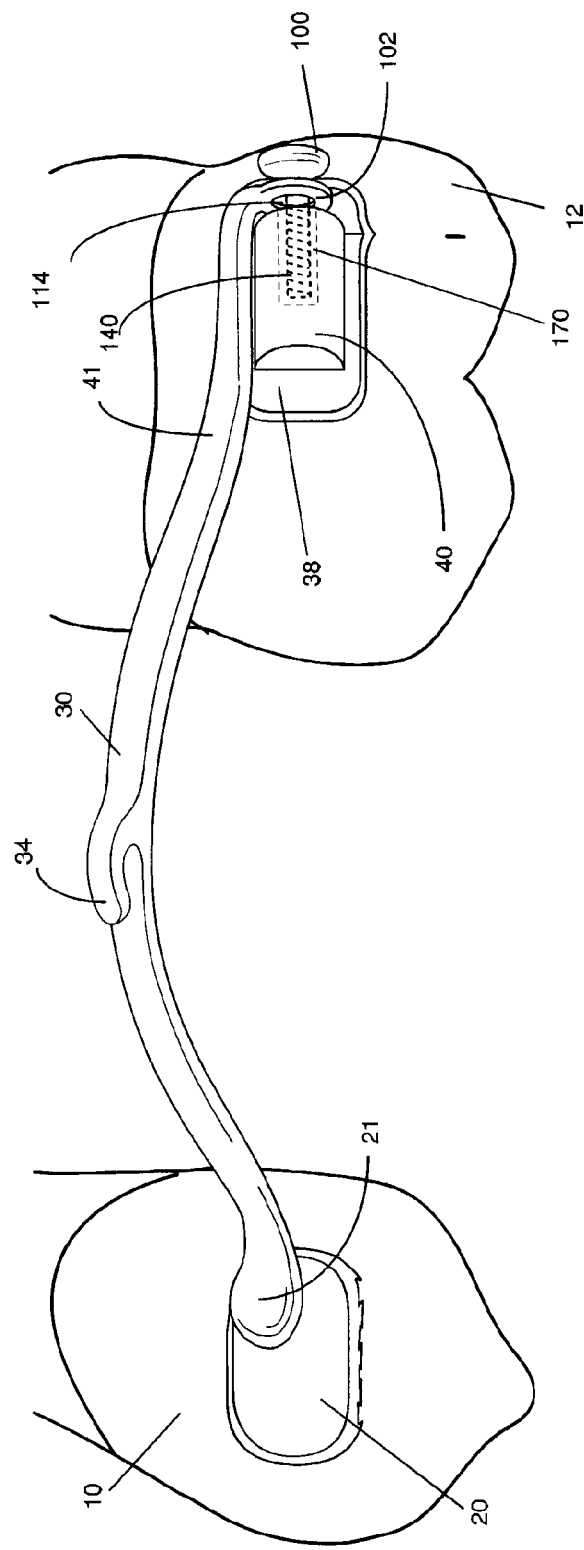
FIG. 16A is side (buccal or lingual) perspective view of a molar distalizer with an arched rod having a molar end that contains a washer end type aperture for receiving a mesiodistally oriented cantilever bolt, in accordance with yet another embodiment of the present invention.
Figure 16B:
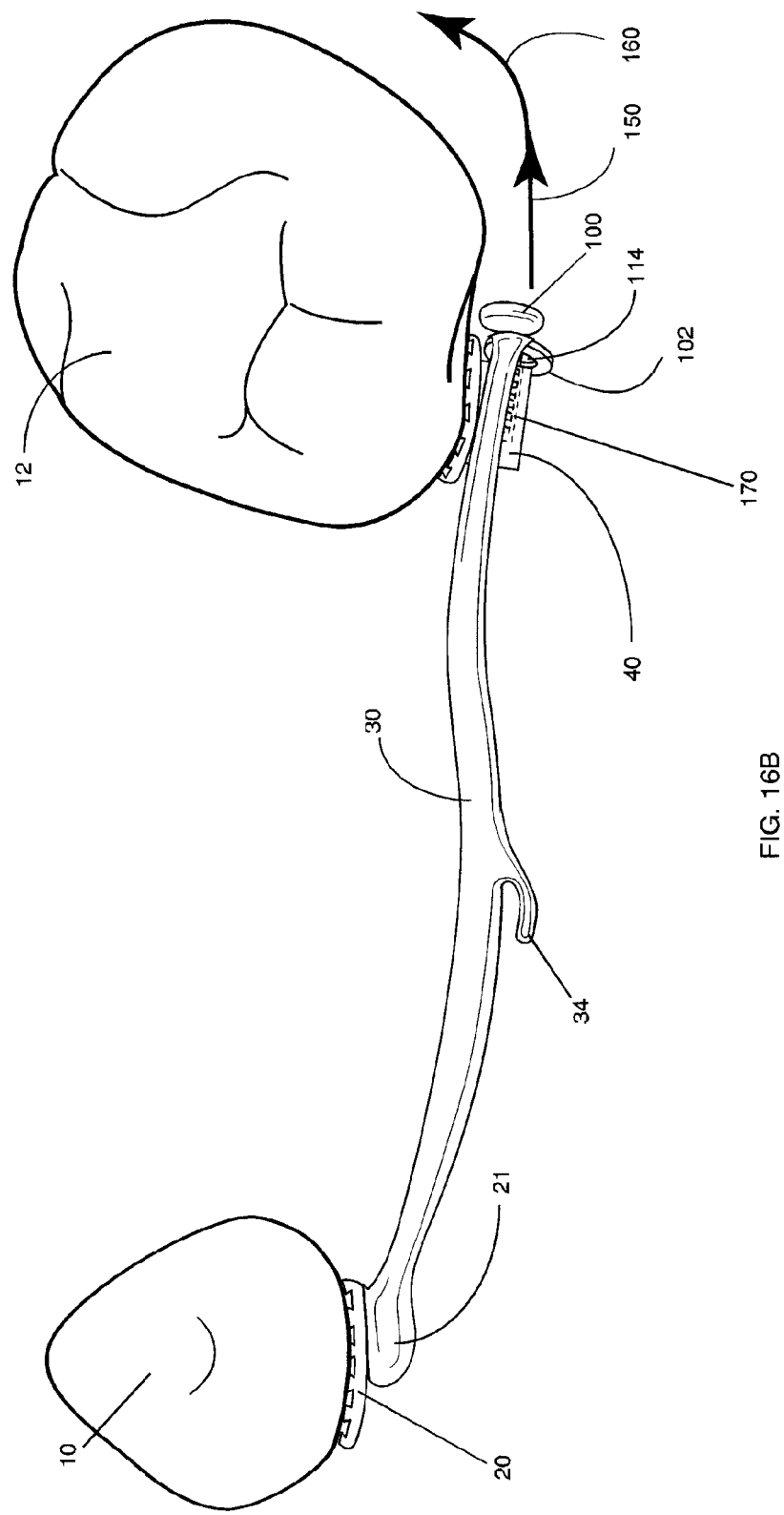
FIG. 16B is an occlusal perspective view of the distalizer of FIG. 16A.

FIGS. 16A-16B depict another embodiment of a molar distalizer where the mushroom bolt is inserted antero-posteriorly for distalization. The distalizer of FIGS. 16A-16B contains similar components as the distalizer of FIGS. 9A-9C, such as a mesial anchor tooth attachment 20, arched rod 30 having hook 34, molar tube 40, and stepped-out ends 21 and 41 as described with respect to the distalizer of FIGS. 9A-9C. However, in the embodiment of the distalizer depicted in FIG. 16A, the molar tube 40, in addition to the standard mesial position on the molar, may be bonded also more distally on the molar 12 for added distalization force at this distal end that it is needed. Molar tube 40 also features a threaded bore 170 extending mesiodistally therein and open from the distal surface thereof towards but not up to the mesial surface.

Rod 30 runs, at a distal end portion thereof, generally parallel to and gingival of the molar tube 40. The distal end of rod 30 ends in a washer 102. Washer 102 may have a circular, oval or round shape. Alternatively, washer 102 may have a quadrilateral shape, or any other polygon (e.g. pentagon, hexagon, and octagon) shape. Washer 102 may be integrally formed to rod 30, or either welded or fastened to the distal tip thereof. The plane of washer 102 is generally perpendicular to the length of the distal end of rod 30 and generally parallel to the distal surface of molar tube 40. Washer 102 has a polygon-shaped, or a circular aperture 114. In one embodiment, the aperture 114 may be a quadrilateral, such as a square, a rectangle, a rhombus, a trapezium, or a parallelogram. In other embodiments, other polygon shapes are also contemplated such as a pentagon, a hexagon, or an octagon. In the embodiment presented in FIGS. 16A-16B, the aperture 114 is circular-shaped. The washer 102 is integrally formed with the distal tip of rod 30. To assemble the distalizer, rod 30 is placed such that washer 102 is distal of the distal wall of the molar tube 40. Then the rod 30 is pulled mesially until washer 102 abuts the distal wall of the molar tube 40, and aperture 114 is in alignment with threaded bore 170. Bolt 100 is then fastened to the molar tube 40 by inserting the threaded portion into the matching threaded bore 170 and tightening until the threaded portion is inside the molar tube's threaded bore 170. Alternatively, the bolt may be welded into the bore 170, which may be threaded or unthreaded (not shown).

To distalize molar 12, the distalizer is moved posteriorly (distally) under force of a traction element connected to hook 34. Specifically rod 30 is moved distally including washer 102. Washer 102 presses distally against head 101 of mushroom bolt 100. Due to the threaded engagement between bolt 100 and molar tube 40, the bolt 100 imparts the distalization force on the molar tube 40 which in turn imparts rotational distalization force on molar 12, as discussed above.

Figure 17:
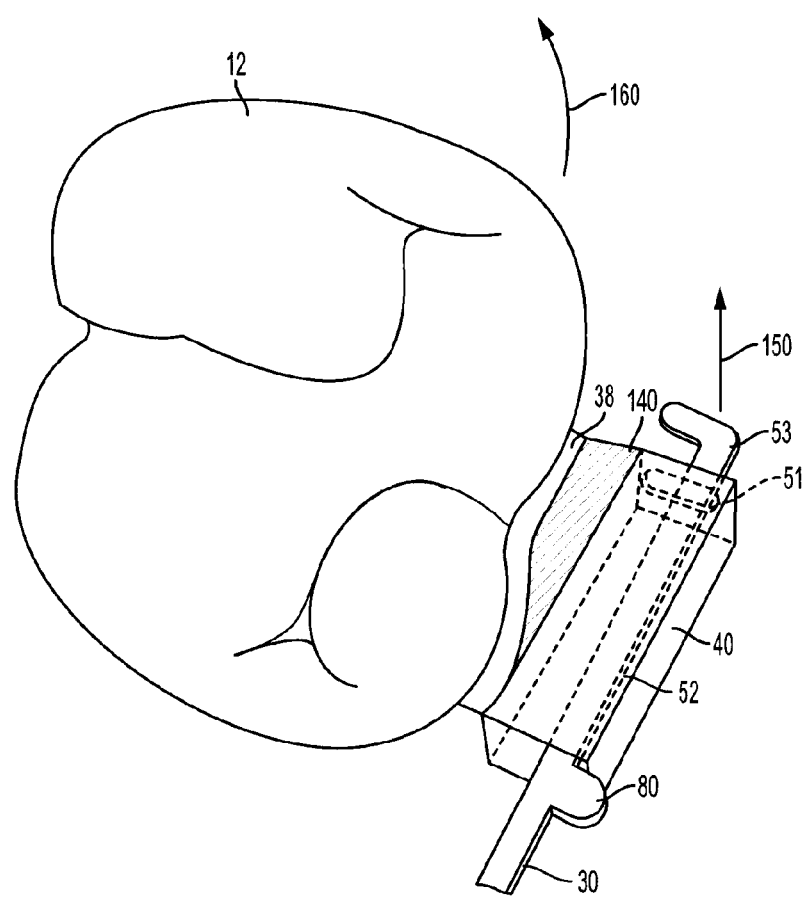
FIG. 17 is a partial occlusal perspective view of the molar end of a molar distalizer featuring a push cam lever, and a molar tube having a pass-through aperture, in accordance with yet another embodiment of the present invention.

FIG. 17 is a partial occlusal bottom view of the molar end of a molar distalizer, in accordance with yet another embodiment of the present invention. The distalizer features a side (buccal push or lingual) cam lever 80 that may be part of the solid mold of the rod 30 or may be separately soldered to the rod 30. The distalizer also features a molar tube 40 for receiving a distal end portion 52 of rod 30 mesiodistally therethrough. The molar tube 40 may have a rectangular profile as shown, or a cylindrical profile, and is attached to a molar 12 via a bonding pad 38. In a preferred embodiment, a wedge of material 140 is placed between the molar tube 40 and bonding pad 38 so as to form an angle between the molar tube and molar tooth. The molar tube 40 features an elongated aperture 51 at the distal wall thereof. Rod 30 enters molar tube 40 at a mesial opening thereof and exits through aperture 51. In one embodiment distal end portion 52 of rod 30 is tapered. To retain rod 30 inside molar tube 40, the distal end portion 52 has a bent back portion 53 to prevent check irritation and also sized to abut the distal wall of molar tube 40 and not to pass through aperture 51 if the rod 30 is pulled mesially.

To distalize the molar, rod 30 is moved distally under force of a traction element applied to a hook thereon. As the rod is moved distally, in the direction denoted by arrow 150, the buccal push cam lever 80 engages and applies distal force against the mesial end of a side (buccal or lingual depending on distalizer positioning) wall of molar tube 40. This imparts a moment (or rotational force) 160 on the molar tube, the wedge 140, the pad 38 and accordingly on molar 12. Advantageously, the wedge 140 helps press distal of the molar palatally to assist rotation thereof.

Figure 18A:
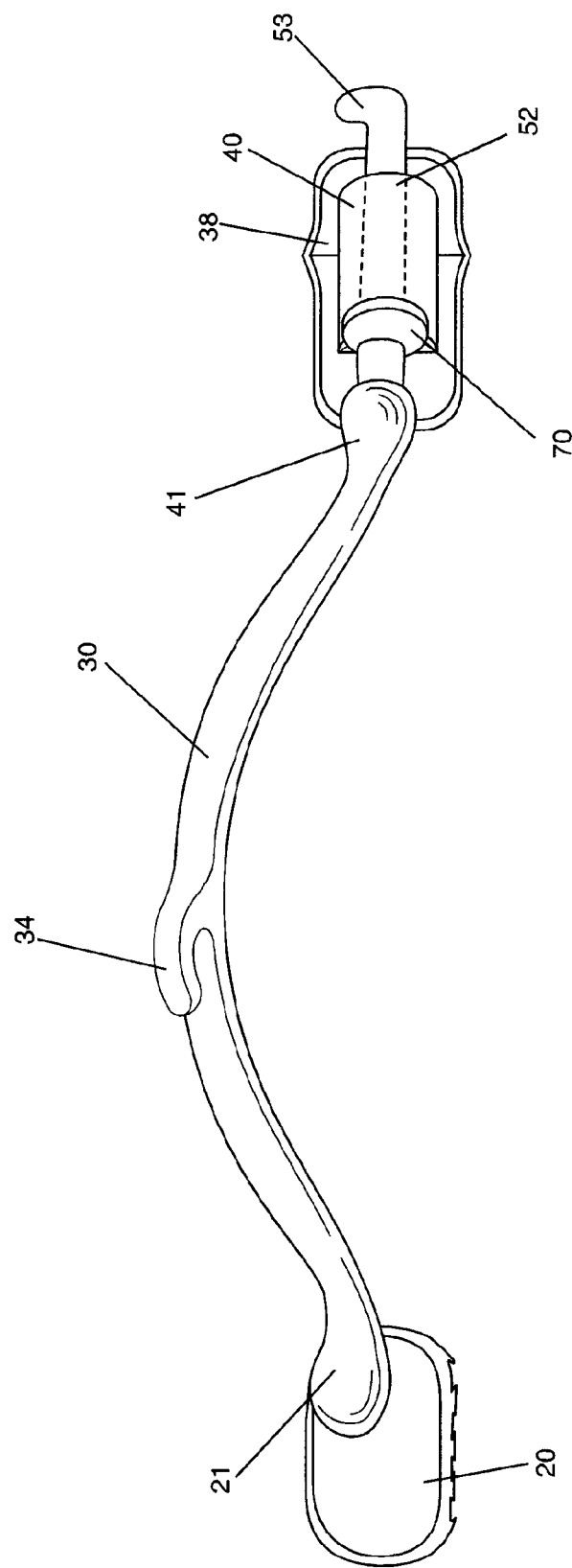
FIG. 18A is a side (buccal or lingual) perspective view of a molar distalizer with an arched rod in the occlusal-gingival dimension, a molar tube with a pass-through aperture, and featuring a disc-shaped push flange lever, in accordance with yet another embodiment of the present invention.
Figure 18B:
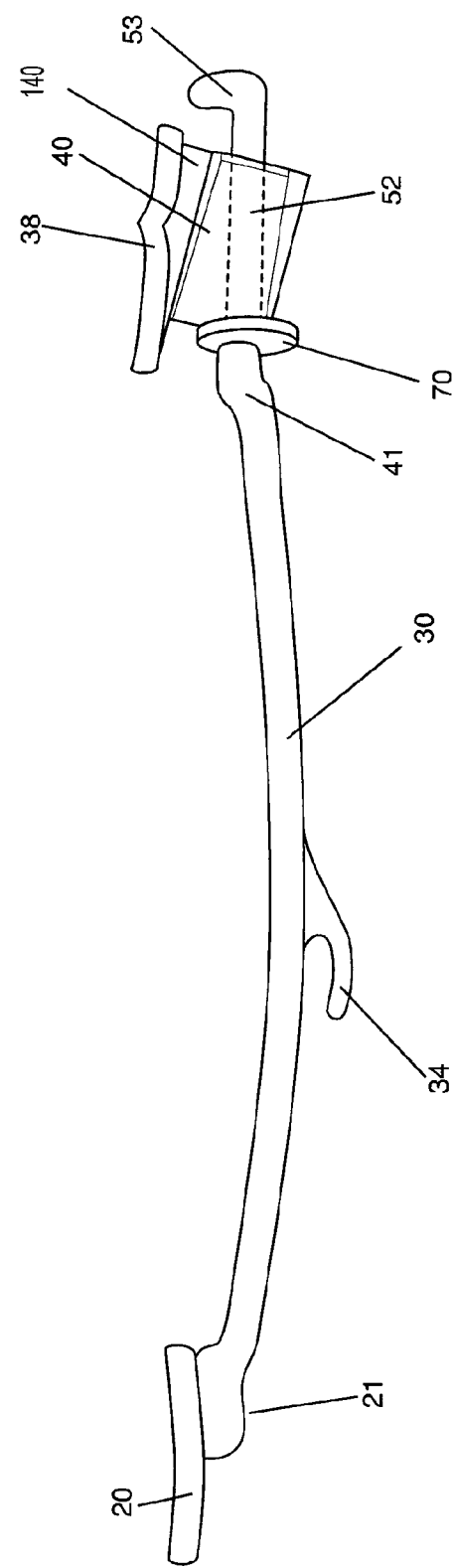
FIG. 18B is an occlusal view of the distalizer of FIG. 18A at the start of distalization.
Figure 18C:
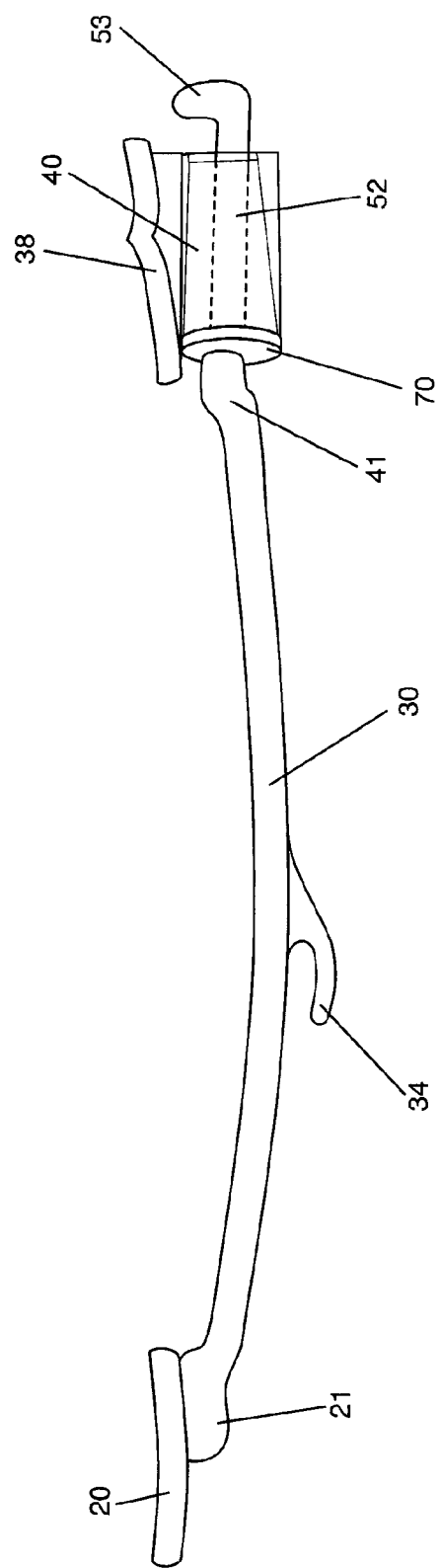
FIG. 18C is an occlusal view of the distalizer of FIG. 18B at the end of distalization.

FIG. 18A is a side (buccal or lingual) perspective view of a molar distalizer with an arched rod 30 featuring a disc-shaped push flange lever 70, in accordance with yet another embodiment of the present invention. This distalizer is a variation on the distalizer of FIG. 17 in that it uses a disc-shaped buccal push flange lever 70 as an alternative to the push cam lever 80 of FIG. 17. It would be apparent to those of skill in the art that other means of applying force on the mesial end of a buccal wall of the molar tube are possible including, but not limited to, protrusions, tabs, and the like. It would also be apparent that the cam or disc-shaped lever may be part of the solid mold of the rod or be separately soldered to the rod 30 or screwed thereon, as known in the art. FIG. 18B is an occlusal view of the distalizer of FIG. 18A at the start of distalization. Under a traction force on hook 34, the rod 30 is distally moved, and push flange lever 70 pushes distally against a mesial wall of molar component 40, imparting rotational force on a molar as described earlier. FIG. 18C is an occlusal view of the distalizer of FIG. 18A at the end of distalization wherein the molar tube 40 has been rotated and the distal end 52 of rod 30 abuts a mesial edge of the pass-through aperture in the molar tube 40

The above-described embodiments are intended to be examples of the present invention and alterations and modifications may be effected thereto, by those of skill in the art, without departing from the scope of the invention, which is defined solely by the claims appended hereto.

What is claimed is:

1. An orthodontic appliance for orthodontic treatment of a posterior maxillary sector extending from a mesial anchor tooth to a molar tooth unilaterally on the same side of the maxilla, comprising:
   a molar component including a bonding pad for affixing the molar component to the molar tooth, the molar component having a mesial opening to an interior of the molar component;
   a mesial anchor tooth attachment, including a bonding pad for affixing the attachment to the mesial anchor tooth;
   a hollow tube having a bore therethrough, extending from the mesial anchor tooth attachment towards the molar component in a mesiodistal direction;
   a hook, provided on a hook plunger located in the bore and slidable therein in a generally mesiodistal direction, the hook for receiving a traction element for direct molar traction; and
   a flexible biasing means disposed in the bore, having a distal end abutting a distal wall of the hollow tube, having a mesial end engaging the hook plunger, and compressible between the hook plunger and the molar component.

2. An orthodontic appliance according to claim 1, wherein the hollow tube has a longitudinal slot within which the hook slides.

3. An orthodontic appliance according to claim 1, wherein the flexible biasing means comprises a spring.

4. An orthodontic appliance according to claim 1, wherein the mesial anchor tooth attachment is formed at a mesial end of a mesial anchor tooth plunger slidable in the bore and having a distal end abutting a mesial end of the hook plunger.

5. An orthodontic appliance according to claim 4 wherein the hook plunger slides distally under a force of the traction element and the mesial end of the hook plunger disengages from the distal end of the mesial anchor tooth plunger thus a distalization force is applied to the molar tooth but not the mesial anchor tooth.

6. An orthodontic appliance for orthodontic treatment of a posterior maxillary sector extending from a mesial anchor tooth to a molar tooth unilaterally on the same side of the maxilla, comprising:
   a molar component including a bonding pad for affixing the molar component to the molar tooth, the molar component having a mesial opening to an interior of the molar component;
   an outer tube extending mesiodistally, having V-shaped grooves lining an inside surface thereof, and having a distal molar end for engaging the molar component;

an inner hollow tube slidably inserted inside the outer tube, having a tapered mesial end, having a distal end including protrusive ends sized to fit within the V-shaped grooves for having a ratchet effect between the outer tube and inner tube; and a mesial anchor tooth plunger slidably inserted inside the inner tube, the plunger having the mesial anchor tooth attachment at a mesial end thereof and a bar stop at a distal end thereof sized for cooperating with the tapered mesial end of the inner tube for retaining the mesial anchor tooth plunger inside the inner tube;

wherein the length of the appliance is adjusted by sliding the inner tube within the outer tube, and by sliding the mesial anchor tooth plunger within the inner tube.

7. An orthodontic appliance according to claim 6, wherein the length of the appliance is preserved by crimping on at least one of the outer tube and the inner tube.

8. An orthodontic appliance according to claim 6, further comprising:

a first C-clasp slid on a mesial end of the outer tube and crimped for holding the outer tube and the inner tube in frictional engagement; and a second C-clasp slid on the tapered mesial end of the inner tube and crimped for holding the inner tube and mesial anchor tooth plunger in frictional engagement;

wherein the first and second C-clasps preserve the length of the appliance.

9. An orthodontic appliance according to claim 6, wherein the mesial anchor tooth plunger extends through the inner tube and into the outer tube, and wherein the outer tube has an inner spring for flexibly biasing the distalizer in an extended configuration in the mesiodistal direction.

10. An orthodontic appliance for orthodontic treatment of a posterior maxillary sector extending from a mesial anchor tooth to a molar tooth unilaterally on the same side of the maxilla, comprising:

a molar component including a molar bonding pad for affixing the molar component to the molar tooth;

a mesial anchor tooth attachment, including a bonding pad for affixing the attachment to the mesial anchor tooth;

a rod, arched towards the gingival direction in the occlusal-gingival plane, extending at a first end thereof from the mesial anchor tooth attachment in a mesio-distal direction towards the molar component at a second end; and a hook, located on a middle portion of the rod at or near the highest point thereof, for attachment with a traction element for direct molar traction;

wherein the rod exerts a distal force on the molar tooth when under a force of the traction element on the hook;

wherein the rod is offset from the mesial anchor tooth pad and from the molar bonding pad by a directed step-out at the first end in one of a buccal and a lingual direction.

11. An orthodontic appliance according to claim 10, wherein:

the rod includes an aperture, and a bolt having a stem is inserted through the aperture and attached to the molar component; and when the rod is moved under traction force applied to the hook, a mesial wall of the aperture abuts against the stem causing the stem to tilt producing a turning force onto the molar component.

12. An orthodontic appliance according to claim 11, wherein the molar component has a threaded bore, and the bolt stem has a matching thread, and the bolt is attached to the molar component by threaded engagement of the bolt and the molar component.

13. An orthodontic appliance according to claim 10, wherein:

a distal end of the rod ends in a washer having an aperture;

the molar component has a threaded bore extending mesiodistally therein and open from a distal wall thereof;

the rod is placed such that the washer abuts the distal wall and the aperture is aligned with the threaded bore;

a threaded bolt having a matching thread as the threaded bore is fastened into the threaded bore of the molar component and tightened.

14. An orthodontic appliance according to claim 10, wherein:

a distal end of the rod ends in a washer having an aperture;

the molar component has a bore extending mesiodistally therein and open from a distal wall thereof;

the rod is placed such that the washer abuts the distal wall and the aperture is aligned with the threaded bore;

a bolt is inserted into the bore of the molar component and welded therein.

15. An orthodontic appliance according to claim 10, wherein:

the molar component comprises a tube having a rectangular cross section including a mesial opening defined by mesial edges, and a distal wall having an elongated aperture;

the rod has a cam extending buccally or lingually therefrom and positioned to engage one of the mesial edges for applying distalization force on the molar component when the rod is under traction force, and the rod has a distal end extending through the elongated aperture.

16. An orthodontic appliance according to claim 15, wherein the distal end of the rod has a bent portion for retaining the rod within the molar tube.

17. An orthodontic appliance according to claim 10, further comprising:

a wedge of material placed between the molar component and the molar bonding pad such that an angle is formed between the molar component and a molar tooth it is attached thereto to produce molar rotation.

18. An orthodontic appliance according to claim 10, wherein:

the molar component comprises a tube having a mesial opening defined by mesial edges, and a distal wall having an elongated aperture;

the rod has a push flange extending buccally or lingually therefrom and positioned to engage one of the mesial edges for applying distalization force on the molar component when the rod is under traction force, and the rod has a distal end extending through the elongated aperture.

* * * * *